United States Patent [19]

Kinsey, Jr. et al.

[11] 4,259,975
[45] Apr. 7, 1981

[54] STOCK TANK GAUGER-LEVEL CONTROLLER

[75] Inventors: Ennis W. Kinsey, Jr.; Carlos Gonzalez; James T. Cox, all of Andrews, Tex.

[73] Assignee: Conoco, Inc., Ponca City, Okla.

[21] Appl. No.: 30,264

[22] Filed: Apr. 16, 1979

[51] Int. Cl.³ .................. G01F 23/10; G01F 23/12
[52] U.S. Cl. ........................................ 137/1; 137/386; 137/392; 137/112; 73/301; 73/313; 73/749; 200/84 C; 222/155; 361/178; 417/40
[58] Field of Search .................. 137/386, 392, 412, 1; 417/36, 40; 200/84 C; 222/67, 155; 73/301, 308, 313, 749; 361/178

[56] References Cited

U.S. PATENT DOCUMENTS

| | | | |
|---|---|---|---|
| 347,589 | 8/1886 | Ghegan | 137/412 |
| 355,815 | 1/1887 | Ghegan | 137/412 UX |
| 530,592 | 12/1894 | Kleritj | 73/313 |
| 785,438 | 3/1905 | Sargent | 73/749 |
| 1,346,898 | 7/1920 | Kingsburg | 417/36 |
| 2,456,233 | 12/1948 | Wolf | 250/83 |
| 2,520,175 | 8/1950 | Socke | 222/155 |
| 2,526,192 | 10/1950 | Battles et al. | 73/323 |
| 2,685,797 | 8/1954 | Morschel | 73/319 |
| 2,696,738 | 12/1954 | Lupfer | 73/299 |
| 2,720,785 | 10/1955 | Sedgwick | 73/314 |
| 3,163,731 | 12/1964 | Lyden | 200/84 |
| 3,389,603 | 6/1968 | Jacobs | 73/308 |
| 3,473,102 | 10/1969 | Williams | 73/313 |
| 4,064,755 | 12/1977 | Bongort et al. | 73/313 |

Primary Examiner—Martin P. Schwadron
Assistant Examiner—G. L. Walton
Attorney, Agent, or Firm—A. Joe Reinert

[57] ABSTRACT

Liquid level in tanks is gauged an can be controlled as follows. Liquid communication is provided from near the bottom of the tank to a liquid reservoir containing a liquid which is of different density and immiscible with the tank liquid. The reservoir is in liquid communication with a vertically elongated vessel having a relatively small horizontal area compared to the tank, communication being near the top of the reservoir if the reservoir liquid is less dense than the tank liquid and being near the bottom of the reservoir if the reservoir liquid is more dense than the tank liquid. The elongated vessel, which can be transparent or translucent so that the liquid level therein corresponding to the liquid level in the tank can be readily determined, can contain a float containing a proximity sensor triggering element. An array of proximity sensors can be positioned along the vertical vessel as needed for level control in the tank and connected to a controller which in turn is connected to valves and/or pumps controlling liquid level in the tank. The top of the vertical vessel can be in gaseous communication with the top of the tank or in communication with the atmosphere if the pressure above the liquid in the tank is equalized with atmospheric pressure.

19 Claims, 1 Drawing Figure

STOCK TANK GAUGER-LEVEL CONTROLLER

BACKGROUND OF THE INVENTION

The invention relates to gauging of liquid levels in stock tanks, such as are employed with petroleum production.

In one aspect, liquid levels are gauged and controlled.

BRIEF DESCRIPTION OF THE PRIOR ART

The following comprises, inter alia, a prior art statement in compliance with the guidance of 37 CFR 1.56, 1.97, and 1.98.

The need for gauging levels of liquids in tanks and controlling such levels has been long felt. Thus, U.S. Pat. No. 530,592 discloses a very sophisticated approach for its time involving placing a float having a magnet contained therein in a sight glass communicating with a liquid-containing vessel and then detecting the fluid level indicated by the float position by a series of compass needles. Alarms are also activated according to the disclosure by closing of an electrical circuit by swinging of the needles in response to magnet position. The invention is disclosed to be particularly useful with steam boilers.

A particular field of interest today is the gauging of levels in stock tanks containing petroleum and/or brine associated with production of oil. Oil level in such tanks is customarily gauged by opening a hatch near the top and inserting a pole or tape having a plumb bob thereon to the bottom, and then determining the level in the tank by wetting of the pole or tape. This method gives very accurate results, but is quite costly in terms of time required.

In another area of particular interest today, pumps and/or valves which pump liquid such as petroleum into or out of stock tanks in association with production or refinery operations are customarily electrically controlled from a centralized controller. Level sensors which provide input into such controllers are customarily comprised of floats mounted on arms within the stock tank. Such are extremely vulnerable to the effects of corrosion and other adverse effects leading to frequent malfunctions. A clear need exists for improved level sensing for consquential activation of valves and/or pumps which maintain liquid levels in the stock tank.

A series of prior art patents, in addition to U.S. Pat. No. 530,592, shows the concept of placing a float containing a proximity sensor triggering element in an elongated vessel such as a sight glass in communication with a liquid-containing vessel such as a stock tank. Thus, U.S. Pat. No. 2,720,785 discloses determining liquid level by a variation in a ribbon ionization path in a neon tube in response to the position of a magnet on a float. U.S. Pat. No. 2,685,797 discloses an improvement on U.S. Pat. No. 530,592, and further discloses controlling fluid level in a tank in response to the level of the float which contains a magnet. U.S. Pat. No. 2,456,233 relates to the same general concept, but determines float position and consequent liquid level in a tank by measuring radiation emitted by a float containing a radioactive source. U.S. Pat. No. 3,389,603 also relates to the same general concept, but detects the float position and consequent liquid level by means of a reed switch sensitive to proximity of the magnet-containing float. U.S. Pat. No. 3,163,731 employs a mercury tube switch sensitive to proximity of a magnet-containing float.

The invention at hand is distinguished over the above references, and constitutes a very substantial improvement thereon, in that the liquid in the sight glass of the instant invention differs from, is immiscible with, and has a density different from the liquid in the storage vessel. Hence, liquid in the storage vessel is not present in the sight glass. Thus, when the tank vessel is a liquid such as a dark colored petroleum, the sight glass is not made opaque thereby and the float mechanism is not subject to corrosive or deleterious effects of the liquid in the tank.

U.S. Pat. No. 2,696,738 employs a liquid in a sight glass which is different from the liquid in the storage vessel. The two liquids are separated by balloon-like expandable bags or diaphragms as shown in FIGS. 1 and 2. Such balloon-like members or diaphragms, which are made of elastomeric materials, are susceptible to deleterious effects of stock tank liquids such as petroleum. Such can be expected to have a very limited life in service. Such diaphragm or balloon-like members are also susceptible to puncturing or other injury. The method also suffers the disadvantage of the liquid in the sight glass being less responsive to the level of liquid in the tank. The instant invention employs the interface between immiscible liquids to separate the sight glass liquid from the tank liquid. It constitutes an improvement over U.S. Pat. No. 2,696,738 for a number of reasons, including overcoming the disadvantages heretofore mentioned and in having greater sensitivity.

According to the instant invention, a float, a proximity sensor triggering element, a float proximity sensor, and controlled circuits for regulating the fluid level can be employed, none of which are suggested by U.S. Pat. No. 2,696,738.

U.S. Pat. No. 2,520,175 discloses employing a liquid in a sight glass different from the liquid in the liquid-containing vessel. However, separation of the liquids is provided by a gas-containing volume, the vessel being sealed from the atmosphere. Liquid level sensors and control circuits are not disclosed.

U.S. Pat. No. 2,526,192 discloses employing a sight glass for a crude oil storage tank wherein the sight glass contains salt water. No reservoir of immiscible sight glass liquid is provided, no level sensor or control circuits are disclosed. The instant invention is distinct from and not obvious in view of this disclosure.

A searcher who conducted a pre-examination search relating to this application cited the patents that are discussed hereinabove. No representations are made as to the thoroughness or exhaustiveness of the pre-examination search which was conducted.

OBJECTS OF THE INVENTION

An object of the invention is to provide an improved process and apparatus for gauging of levels in tanks, particularly levels of petroleum or brine in stock tanks associated with oil production. Another object of the invention is to provide a process and apparatus for controlling input and/or output from such tanks in response to an improved level sensing means and method.

SUMMARY OF THE INVENTION

A process and apparatus are provided for gauging and control of liquid level in tanks in accord with the following. Liquid communication is provided from near the bottom of the tank to a liquid reservoir containing a liquid which is of different density and which is immiscible with the tank liquid. The reservoir is in liquid communication with a vertically elongated vessel having a relatively small horizontal area compared to the tank, communication being near the top of the reservoir if the reservoir liquid is less dense than the tank liquid and being near the bottom of the reservoir if the reservoir liquid is more dense than the tank liquid. The elongated vessel, which can be transparent or translucent so that the liquid level therein corresponding to the liquid level in the stock tank can be readily determined, can contain a float containing a proximity sensor triggering element. An array of proximity sensors can be positioned along the vertical vessel as needed for level control in the tank and connected to a controller which in turn is connected to valves and/or pumps controlling liquid level in the tank. The top of the vertical vessel can be in gaseous communication with the top of the tank or with the atmosphere. If in communication with the atmosphere, the pressure of gas above the liquid level in the stock tank must be equalized with atmospheric pressure, as by having a vent to the atmosphere.

DESCRIPTION OF THE DRAWINGS

Figure 1:
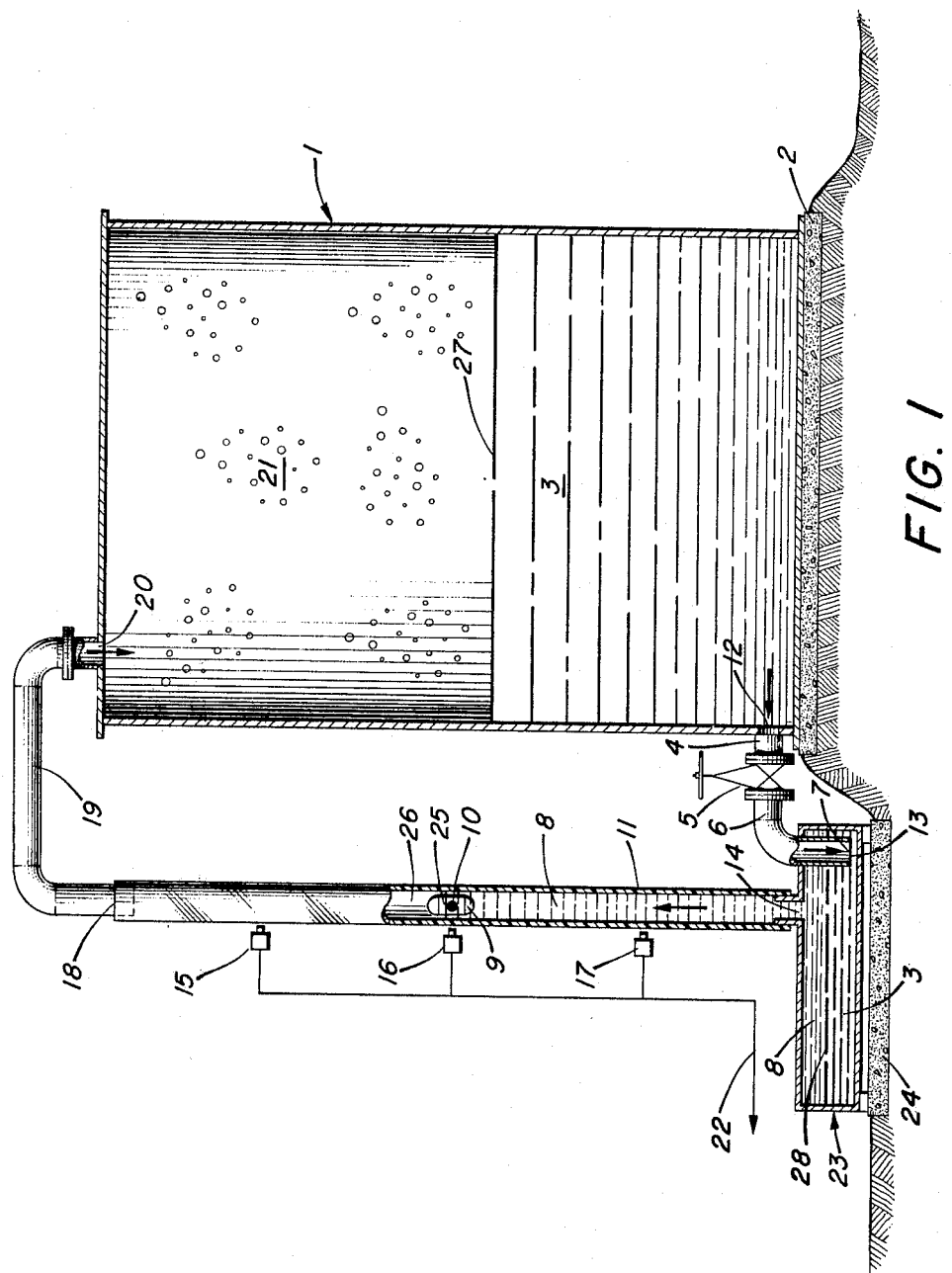
FIG. 1 is a semischematic cross section of a stock tank having an example of the apparatus of the invention mode shown wherein the liquid in the vertically elongated vessel is less dense than the liquid in the tank.

In accord with the embodiment of the invention illustrated in FIG. 1, tank 1 containing liquid 3 which can be petroleum, rests on base 2. Liquid communication is provided from near the bottom of tank 1 by way of opening 12, pipe 4, valve 5, and pipe 6 having its lower end 7 having an opening 13 near the bottom of reservoir 23 resting on base 24. Because of such communication, liquid 3 in reservoir 23 is in communication with liquid 3 in tank 1.

Interface 28 separates liquid 3 in reservoir 23 from liquid 8 extending above interface 28 in reservoir 23 through opening 14 into column 11. In this embodiment, liquid 8 is immiscible with liquid 3 and of less density than liquid 3. A float 9 having proximity sensor triggering element 10 floats on surface 25 of liquid 8.

Gas 26 above surface 25 in column 11 is in fluid communication via opening 18, line 19, and opening 20 with gas 21 above surface 27 of liquid 3 in tank 1.

Proximity sensors 15, 16, and 17 are connected via lines 22 to a controller (not shown) which can open and close valves and activate pumps on lines (not shown) for removing or inputting liquid 3 into the tank.

Figure 2:
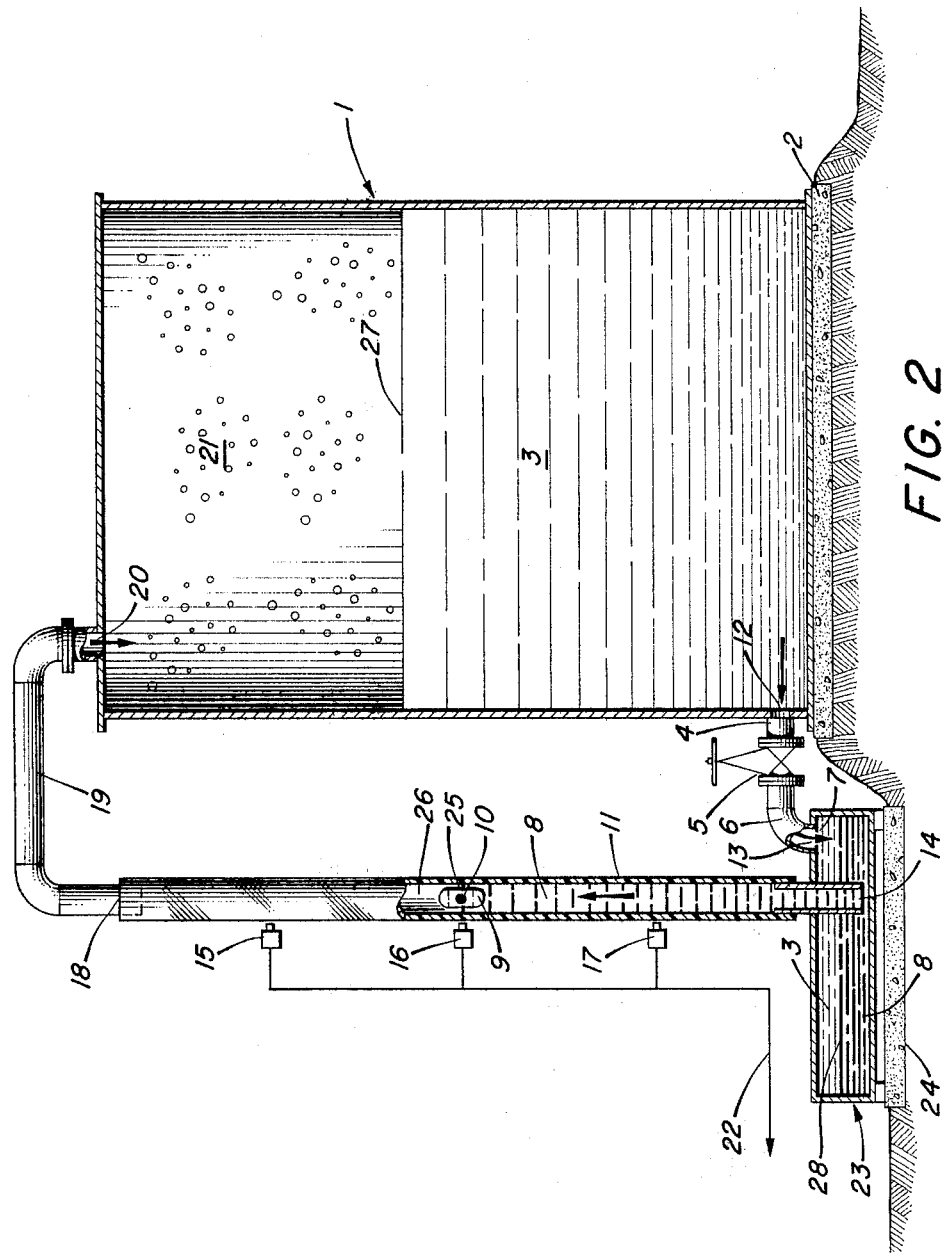
FIG. 2 illustrates a semischematic cross section of a mode of the invention wherein the liquid in the vertically elongated vessel is more dense than the liquid in the stock tank.

In accord with the embodiment of the invention illustrated in FIG. 2, tank 1 containing liquid 3, which can be petroleum, rests on base 2. Liquid communication is provided from near the bottom of tank 1 by way of opening 12, pipe 4, valve 5, and pipe 6 having its lower end 7 having an opening 13 near the top of reservoir 23 resting on base 24. Because of such communication, liquid 3 in reservoir 23 is in communication with liquid 3 in tank 1.

Interface 28 separates liquid 3 in reservoir 23 from liquid 8 extending below interface 28 in reservoir 23 through opening 14 into column 11. In this embodiment, liquid 8 is immiscible with liquid 3 and of greater density than liquid 3. A float 9 having proximity sensor triggering element 10 floats on surface 25 of liquid 8.

Gas 26 above surface 25 in column 11 is in fluid communication via opening 18, line 19, and opening 20 with gas 21 above surface 27 of liquid 3 in tank 1.

Proximity sensors 15, 16, and 17 connect via lines 22 to a controller (not shown) which can open and close valves and activate pumps on lines (not shown) for removing or inputting liquid 3 into the tank.

Figure 3:
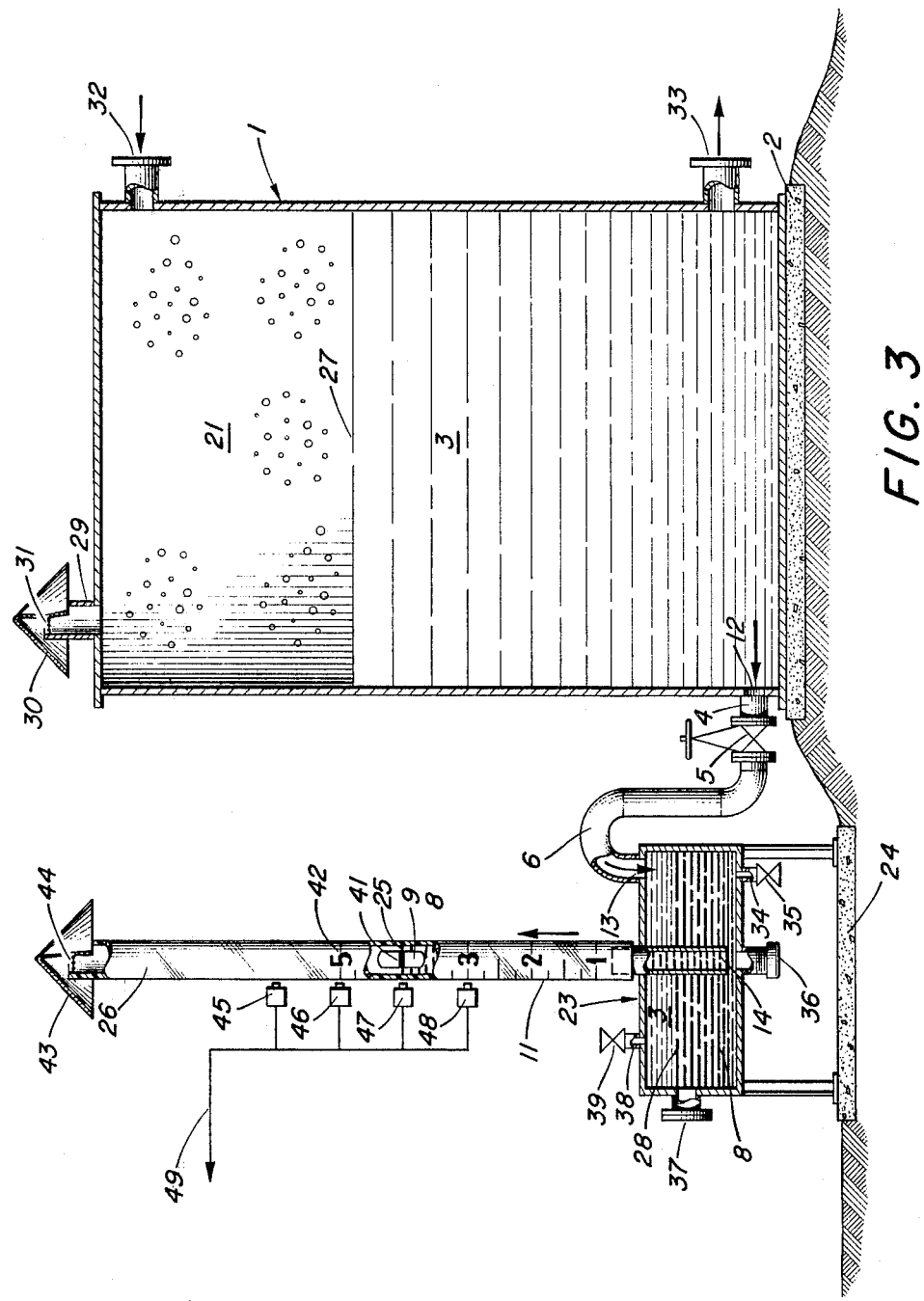
FIG. 3 illustrates a semischematic cross section of a mode of the invention wherein the liquid in the vertically elongated vessel is more dense than the liquid in the stock tank.

In accord with the embodiment of the invention illustrated in FIG. 3, tank 1 containing liquid 3, which can be salt brine, rests on base 2. Liquid communication is provided from near the bottom of tank 1 by way of opening 12, pipe 4, valve 5, and pipe 6 having an opening 13 near the top of reservoir 23 resting on base 24. Because of such communication, liquid 3 in reservoir 23 is in communication with liquid 3 in tank 1.

Interface 28 separates liquid 3 in reservoir 23 from liquid 8 extending below interface 28 in reservoir 23 through opening 14 in column 11. In this embodiment, liquid 8 is immiscible with liquid 3 and of greater density than liquid 3. A float 9 is fabricated of stainless steel and functions as a proximity sensor triggering element floating on surface 25 of liquid 8.

Gas 26, normally air, above surface 25 in column 11 is in fluid communication with the atmosphere through screen 44 under raincap 43. Proximity sensors 45, 46, 47, and 48 connect via lines 49 to a controller (not shown) which can open and close valves and activate pumps on lines (not shown) for removing or inputting liquid into the tank via inlet 32 and outlet 33.

Gas 21, normally air, in the instance of a brine-containing tank, is at atmospheric pressure, and in the case of air, communicates with the atmosphere via line 29 through screen 31 under raincap 30.

Reservoir 23 has inlet 38 having valve 39 for inputting liquid 3 on chargeup. The reservoir also has opening 37 for easy clean out, for treating the interior with corrosion resistant coatings, and the like. A hatch 36 is provided for easy access to the float and the like. A reservoir drain line 34 and valve 35 is also provided.

PREFERRED EMBODIMENTS OF THE INVENTION

In accord with one presently preferred mode of the invention, and referring to FIG. 2, tank 1 which is a conventional stock tank for holding a liquid 3, which can be petroleum, is situated on base 2 on a producing lease. An opening 12 near the bottom of the tank provides liquid communication of the petroleum through line 4, valve 5, and line 6 to opening 13 near the top of the reservoir 23 such that the liquid petroleum 3 in reservoir 23 is in fluid communication with the liquid 3 in tank 1. A liquid 8 (methanol) forms liquid-liquid interface 28 and lies below liquid 3 (petroleum). Reservoir 23 is fluid-tight and connects via opening 14 to column 11 which is fabricated of semitransparent polyvinyl chloride pipe mounted alongside tank 1. The liquid 8 (methanol) is more dense (8.0 lb/gal) than the liquid 3 (oil varying from 6 lb/gal to nearly 8.0 lb/gal). As the level 27 of liquid 3 in stock tank 1 rises and falls, the level 25 of liquid 8 in column 11 also rises and falls in exact correlation thereto. Gas 26 passes via opening 18, line 19, and opening 20 in gaseous communication with gas 21 in the volume above the liquid in tank 1 such that the volumes are equalized. Float 9 having proximity sensor triggering element 10 floats up and down in relation to level 25 of liquid 8.

The level 27 in tank 1 is readily determined by observation of the level 25 in column 11 through the semi-transparent tube. Column 11 remains clean over long periods of time allowing ready visual gauging of liquid level in tank 1 and avoiding corrosion and fouling problems.

In accord with another presently preferred mode of the invention, and referring to FIG. 3, tank 1 which is a conventional stock tank for holding a liquid 3 (in this case, a brine having a density of 8.5 to 9.5 lb/gal), is situated on base 2 on a producing lease. An opening 12 near the bottom of the tank provides liquid communication of the brine through line 4, valve 5, and line 6 to opening 13 near the top of the reservoir 23 such that the brine 3 in reservoir 23 is in fluid communication with the brine 3 in tank 1. A liquid 8, in this case butyl benzyl phthalate having a density of 9.3 lb/gal, forms liquid-liquid interface 28 and lies below liquid 3 (brine). Reservoir 23 is fluid-tight and connects via opening 14 to column 11 which is fabricated of semitransparent thermoplastic pipe mounted alongside tank 1. The liquid 8 (butyl benzyl phthalate) is more dense (9.3 lb/gal) than the liquid 3 (brine varying from 8.5 to 9.5 lb/gal, but generally of constant density for a particular application). As the level 27 of liquid in stock tank 1 rises and falls, the level 25 of liquid 8 in column 11 also rises and falls in exact correlation thereto. Air 26 above the level 25 passes via screen 44 under raincap 43 to the atmosphere. Air 21 above level 27 in stock tank 1 communicates with the atmosphere via opening 29 and screen 31 under raincap 30. Thus, atmospheric pressure is exerted above both liquid level 27 and liquid level 25. Float 9 is fabricated of stainless steel. It floats up and down in relation to level 25 of liquid 8.

Proximity sensor 45 is an extreme high level alarm sensor, sensor 46 is a high level sensor, and sensor 47 is a pump start sensor for emptying the tank, and sensor 48 is a sensor to stop the pump when the tank level is sufficiently lowered. Such sensors are conventional off-the-shelf items normally employed for counting ball bearings in manufacturing facilities. These sensors are connected via line 49 to a controller which activates pumps, valves, alarms, and the like.

The level 27 in tank 1 is readily determined by observation of level 25 in column 11 through the semitransparent tube. Column 11 remains clean over long periods of time allowing ready visual gauging of the liquid level in tank 1 and avoiding corrosion and fouling problems.

A stripe 41 is emplaced on float 9 and numerical gauging scale 42 is emplaced on column 11 for exact gauging of the level 27 in the tank.

In accordance with one embodiment, level markers are provided on the column corresponding to levels in the stock tank and also to volumes of liquid in the stock tank. Such corresponding levels and/or volumes are readily calculated by those skilled in the art knowing the comparative density of the liquids, and the cross-sectional area of the stock tank. In accord with another presently preferred mode, a proximity sensor triggering element 25, which can be a magnet, is sealed within float 9 and exactly follows the upward and downward movement of level 25 in column 8 which in turn exactly corresponds to upward and downward movement of level 27 in tank 1.

In accord with a presently preferred mode, the stock tank is employed as a surge tank for production operations. The float has a strong magnet sealed within a thermoplastic enclosure which is less dense than the liquid in the column. Proximity sensors 15, 16, and 17 which can be devices such as are commonly industrially employed to count ball bearings are arrayed such that one proximity sensor is at the lower level desired, a second is at the upper level desired, and a third is at a still higher level which functions as a safety measure to shut off the system flowing oil to the tank. The proximity sensors are connected to a controller. In one arrangement, proximity sensor 16 activates a pump on a line removing petroleum from the stock tank while proximity sensor 17 stops the pump. Oil continually passes into the tank via a line from the production units. The upper proximity sensor 15 shuts off the production units should the removal pump fail to operate such that the oil raises to this level. If the level should reach this height, the proximity sensor senses the proximity of the magnet in the float and in turn is rigged to sound an alarm alerting maintenance personnel.

In accord with the embodiment of the invention illustrated in FIGS. 2 and 3, the volume of the reservoir between its upper surface and the opening 14 into the column is preferred to be at least as great as that of the volume of the column below the highest level to be gauged.

It is also within the scope of this invention to employ various other sensor arrays, control setups, and controller-activated valves and/or pumps to employ the stock tank gauger-level controller described and claimed herein in a variety of circumstances.

Though crude oils vary in density, for a particular operation the density will generally remain relatively constant. Thus, a scale can be calibrated on column 11 to exactly correspond to level or volume of liquid in the tank.

The liquid 8 which is employed as a sight liquid can be any liquid which is immiscible with the liquid in the tank and which is of a different density than the liquid in the tank. It is normally desirable that the column liquid be close to the same density as the liquid in the tank, but this is not necessary. Suitable column liquids are readily chosen by those skilled in the art using the criteria named, (1) that the column liquid be of a different density and (2) that it be immiscible. Of course, the liquids should be nonreactive with each other. Published literature or simple experimentation not amounting to invention can be employed to choose suitable column liquids. Suitable column liquids include materials such as methanol, diesters such as butyl benzyl phthalate, silicone liquids, halogenated hydrocarbons, mercury, hydrocarbons, polymeric ethylene oxide addition products, and the like. Mixtures can also be employed as long as the criteria of immiscibility, different density, and nonreactivity are satisfied. It is desirable that the column liquid not be biodegraded while in use. Use of materials of low biodegradability or addition of biocides is preferred. When the column is transparent or translucent, it is often desirable to add a dye which is soluble in the column liquid but insoluble in the stock tank liquid to the column liquid to improve visibility of the column liquid. The choice of column liquid will, of course, depend on the liquid in the stock tank. The column liquid should not react with or degrade the materials which it contacts or be degraded by such materials.

According to one presently preferred embodiment, the proximity sensor triggering element in the float is a small but powerful magnet. Such magnets are commercially available. Other proximity sensor triggering elements such as metal masses, radioactive sources, and the like can also be employed. In one preferred embodiment, the float is fabricated of metal which is readily sensed by commercial proximity sensors.

The means for sensing the level in the vertically elongated vessel can be by visual means if the vertically elongated vessel is fabricated of a transparent or translucent material. Some suitable materials for such fabrication include polyvinyl chloride, polyvinyl fluoride, halocarbon polymers, and a number of other organic plastics. Tempered glass or ceramic materials can also be employed. Ordinary semitransparent polyvinyl chloride pipe functions quite well for many applications. Metal is less suitable if a magnet or radiation source is employed as the triggering element. If polyvinyl chloride or certain other plastics are employed, care should be exercised in selecting column liquids which will not dissolve or degrade the pipe.

It is not necessary that the vertically elongated vessel be fabricated of a transparent or translucent material if a float containing a proximity sensor triggering element is positioned within the column and floats on the liquid surface in the column and if an array of proximity sensors is positioned along the vertically elongated column as needed for sensing the level of the float, which in turn relates to the level of liquid in the tank.

Various types of proximity sensors can be employed. Examples are described in the prior art cited in this application. Other types are well known to those skilled in the art. For example, reed switches, and the like which are sensitive to the presence of a magnetic field are quite suitable.

The reservoir and piping connections can be fabricated of any conventional material. Ordinary steel is normally quite suitable for petroleum containing stock tank gauging and level controlling applications. Corrosion resistant materials or corrosion resistant interior coatings may be needed in some applications.

The vertically elongated vessel can be in communication directly with the gas above the liquid in the tank by way of a pipe connection or can be of equal pressure to the atmosphere provided that the gaseous volume above the liquid in the tank is also of equal pressure with the atmosphere so that pressure is equalized thereby. If no toxic or objectional gases are present above the liquid in the tank or the column, each can simply be open to the atmosphere through suitable vents that keep out rain, birds, and the like. However, if sour gas or the like is involved, communication may need to be with a recovery system or the like.

The foregoing exemplification and description are provided to more fully explain the invention and to provide information to those skilled in the art on how to carry it out. However, it is to be understood that such is not to function as limitation on the invention as described and claimed in the entirety of this application in view of the state of the art as known to those skilled in the art.

I claim:

1. An apparatus for gauging the level of a liquid in a liquid-containing tank comprising:

(a) a fluid-tight reservoir positioned below the range of levels to be gauged in the tank and in liquid communication from or near the bottom of the fluid-tight reservoir to the tank at a point below the lowest level to be gauged in the tank, (b) a vertically elongated vessel having bottom liquid communication with or near the upper portion of the reservoir and having top gaseous communication with the gas above the liquid in the tank providing a state of pressure equalization, (c) in the upper portion of the reservoir and communication into the vertically elongated vessel, sufficient of a liquid which is substantially immiscible with and of less density than the liquid in the tank so as to be at least partially in the reservoir at all times, and (d) means for sensing the level in the vertically elongated vessel;

the vertically elongated vessel extending over the vertical interval of the surface elevations of columns of the liquid in the vertically elongated vessel that are equivalent to the surface elevations of like columns of the liquid in the tank over the range of liquid levels to be gauged in the tank and said range of liquid levels to be gauged is determined by the level of the less dense liquid which is higher than the level of the more dense liquid.

2. The apparatus of claim 1 wherein the vertically elongated vessel is fabricated as a column and is fabricated of a transparent or translucent material and provides the means for sensing the level of liquid in the column and consequently in the tank.

3. The apparatus of claim 1 wherein the vertically elongated vessel comprises a column, and wherein the means for sensing the level of liquid in the column comprises:

(e) a float containing a proximity sensor triggering element positioned within the column and floating on the liquid surface in the column, (f) an array of proximity sensors positioned along the vertically elongated column as needed for sensing of the level of the float, which in turn relates to the level of the liquid in the tank.

4. The apparatus of claim 3 wherein the gas above the liquid in the column is in gaseous communication with the atmosphere and wherein the gas above the liquid in the tank is in gaseous communication with the atmosphere.

5. The apparatus of claim 3 wherein the gas above the liquid level in the column is in gaseous communication with the gas above the liquid level in the tank.

6. The apparatus of claim 3 wherein at least two proximity sensors at different levels of the liquid in the column are electrically connected to a controller which in turn is electrically connected to valves or pumps controlling the liquid level in the tank.

7. An apparatus for gauging the level of a liquid in a liquid-containing tank comprising:

(a) a fluid-tight reservoir positioned below the range of levels to be gauged in the tank and in liquid communication from or near the top of the fluid-tight reservoir to the tank at a point below the lowest level to be gauged in the tank, (b) a vertically elongated vessel having bottom liquid communication with or near the bottom portion of the reservoir and having top gaseous communication with the gas above the liquid in the tank providing a state of pressure equalization, (c) in the lower portion of the reservoir and communicating into the vertically elongated vessel, sufficient of a liquid which is substantially immiscible with and of greater density than the liquid in the tank as to be at least partially in the reservoir at all times, and (d) means for sensing the level in the vertically elongated vessel;

the vertically elongated vessel extending over the vertical interval of the surface elevations of columns of the liquid in the vertically elongated vessel that are equivalent to the surface elevations of like columns of the liquid in the tank over the range of liquid levels to be gauged in the tank and said range of liquid levels to be gauged is determined by the level of the less dense liquid which is higher than the level of the more dense liquid.

8. The apparatus of claim 7 wherein the vertically elongated vessel is fabricated as a column, is fabricated of a transparent or translucent material, and provides the means for sensing the level of liquid in the column and consequently in the tank.

9. The apparatus of claim 7 wherein the vertically elongated vessel comprises a column, and wherein the means for sensing the level of liquid in the column comprises:

(e) a float containing a proximity sensor triggering element positioned within the column and floating on the liquid surface in the column, (f) an array of proximity sensors positioned along the vertically elongated column as needed for sensing the level of the float, which in turn relates to the level of the liquid in the tank.

10. A method for gauging the level of a liquid in a liquid-containing tank comprising:

(a) positioning a fluid-tight reservoir below the range of levels to be gauged in the tank and in liquid communication from or near the bottom of the fluid-tight reservoir to the bottom of the tank at a point below the lowest level to be gauged in the tank, (b) situating a vertically elongated vessel in bottom liquid communication with or near the upper portion of the reservoir and in top gaseous communication with the gas above the liquid in the tank providing a state of pressure equalization, (c) positioning sufficient of a liquid which is substantially immiscible with and of less density than the liquid in the tank in the upper portion of the reservoir and into the vertically elongated vessel, and (d) sensing the level in the vertically elongated vessel;

the vertically elongated vessel extending over the vertical interval of the surface elevations of columns of the liquid in the vertically elongated vessel that are equivalent to the surface elevations of like columns of the liquid in the tank over the range of liquid levels to be gauged in the tank and said range of liquid levels to be gauged being determinable by the level of the less dense liquid which is higher than the level of the more dense liquid.

11. The method of claim 10 wherein the vertically elongated vessel is a column and is fabricated of a transparent or translucent material, and wherein the level of liquid in the column and consequently in the tank is determined by visual means.

12. The method of claim 10 wherein the vertically elongated vessel comprises a column, and wherein the level of liquid in the column is sensed by:

(e) positioning therein and floating on the liquid surface of the column a float containing a proximity sensor triggering element, (f) positioning along the vertically elongated column as needed for sensing the level of the float an array of proximity sensors.

13. The method of claim 12 wherein the gas above the liquid in the column is in gaseous communication with the atmosphere and wherein the gas above the liquid in the tank is in gaseous communication with the atmosphere.

14. The method of claim 12 wherein the gas above the liquid level in the column is in direct gaseous communication with the gas above the liquid level in the tank.

15. The method of claim 12 wherein at least two of the proximity sensors at different levels of the liquid in the column are in electrical connection with a controller and wherein the controller is electrically connected to valves or pumps controlling the liquid level in the tank and wherein the controller maintains the liquid level in the tank within predetermined levels.

16. A method for gauging the level of a liquid in a liquid-containing tank comprising:

(a) positioning a fluid-tight reservoir below the range of levels to be gauged in the tank and in liquid communication from or near the top of the fluid-tight reservoir to the tank at a point below the lowest level to be gauged in the tank, (b) positioning a vertically elongated vessel in bottom liquid communication with or near the bottom portion of the reservoir and in top gaseous communication with the gas above the liquid in the tank providing a state of pressure equalization, (c) positioning sufficient of a liquid which is substantially immiscible with and of greater density than the liquid in the tank, at least partially in the lower portion of the reservoir and communicating into the vertically elongated vessel, and (d) sensing the level of the liquid in the vertically elongated vessel;

wherein the vertically elongated vessel extends over the vertical interval of elevations of the surface of columns of the liquid in the vertically elongated vessel that are equivalent to the surface elevations of like columns of liquid in the tank over the range of liquid levels to be gauged in the tank and said range of liquid levels to be gauged being determinable by the level of the less dense liquid which is higher than the level of the more dense liquid.

17. The method of claim 16 wherein the vertically elongated vessel is a column which is fabricated of a transparent or translucent material and wherein the level of liquid in the column is sensed by visual means.

18. The method of claim 16 wherein the vertically elongated vessel comprises a column and wherein the level of liquid in the column is sensed by:

(e) floating a float containing a proximity sensor triggering element on the surface of the liquid in the column, and (f) positioning an array of proximity sensors along the vertically elongated column as needed for sensing the level of the float, which in turn relates to the level of the liquid in the tank.

19. An apparatus for gauging the level of petroleum in a petroleum-containing stock tank comprising:

(a) a fluid-tight reservoir positioned below the range of levels to be gauged in the stock tank and in liquid communication from near the top of the fluid-tight reservoir to the petroleum in the stock tank at a point below the lowest level to be gauged in the stock tank, (b) a transparent or translucent organic polymeric column having liquid communication with or near the bottom portion of the reservoir and having top gaseous communication with the gas above the liquid in the stock tank providing a state of pressure equalization, (c) in the lower portion of the reservoir in communicating into the column, sufficient of methanol so as to be at least partially in the reservoir at all times, (d) floating on the methanol in the column a float containing a magnet, (e) positioned along the column, an array of magnet proximity sensors, (f) the proximity sensors being in electrical contact with a controller, the controller being capable of switching pumps in response to proximity of the magnet, (g) the controller being in electrical contact with pumps in lines leading to or from the stock tank which are activatable by electrical signals sent from the controller;

the vertical column extending over the vertical interval of elevations of surfaces of columns of methanol that are equivalent to surface elevations of columns of the petroleum in the stock tank over the range of levels of petroleum to be gauged in the stock tank and said range of liquid levels to be gauged is determined by the level of the less dense liquid which is higher than the level of the more dense liquid.

* * * * *